(12) United States Patent
Schmidtke et al.

(10) Patent No.: US 6,897,432 B2
(45) Date of Patent: May 24, 2005

(54) IMAGING APPARATUS HAVING DISCONTINUOUS LENS REFERENCE SURFACES AND METHOD OF ASSEMBLING THE IMAGING APPARATUS

(75) Inventors: Gregg S. Schmidtke, Ft Collins, CO (US); Matthias A. Lester, Fort Collins, CO (US); Kelly J. Reasoner, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 624 days.

(21) Appl. No.: 09/813,205

(22) Filed: Mar. 20, 2001

(65) Prior Publication Data

US 2002/0134920 A1 Sep. 26, 2002

(51) Int. Cl.[7] .............................. H01J 3/14; H01J 5/16; G02B 7/02
(52) U.S. Cl. ...................... 250/216; 359/811; 359/819; 359/822
(58) Field of Search .............................. 250/208.1, 216; 359/811, 813, 818, 819, 822, 823

(56) References Cited

U.S. PATENT DOCUMENTS

| | | | |
|---|---|---|---|
| 4,870,268 A | 9/1989 | Vincent et al. | 250/226 |
| 4,926,041 A | 5/1990 | Boyd | 250/226 |
| 5,019,703 A | 5/1991 | Boyd et al. | 250/208.1 |
| 5,032,004 A | 7/1991 | Steinle | 350/171 |
| 5,040,872 A | 8/1991 | Steinle | 359/638 |
| 5,044,727 A | 9/1991 | Steinle | 350/171 |
| 5,210,648 A * | 5/1993 | Bedzyk | 359/813 |
| 5,227,620 A | 7/1993 | Elder, Jr. et al. | 250/208 |
| 5,359,190 A | 10/1994 | O'Regan et al. | 250/216 |
| 5,410,347 A | 4/1995 | Steinle et al. | 348/270 |
| 5,553,172 A | 9/1996 | Kimura et al. | 382/312 |
| 5,581,333 A | 12/1996 | Takemura et al. | 355/243 |
| 5,646,394 A | 7/1997 | Steinle et al. | 250/208.1 |
| 5,909,323 A | 6/1999 | Blake et al. | 359/814 |
| 5,943,153 A * | 8/1999 | Naiki et al. | 359/210 |
| 6,023,350 A | 2/2000 | Nakao | 358/512 |
| 6,069,752 A * | 5/2000 | Harrigan et al. | 359/822 |
| 6,118,598 A | 9/2000 | Gardner, Jr. | 359/811 |
| 6,147,343 A | 11/2000 | Christensen | 250/234 |
| 6,164,543 A | 12/2000 | Kato et al. | 235/462.25 |
| 6,178,016 B1 * | 1/2001 | Ashe et al. | 358/487 |
| 6,194,697 B1 | 2/2001 | Gardner, Jr. | 250/208.1 |
| 6,246,642 B1 * | 6/2001 | Gardner, Jr. et al. | 369/36 |
| 6,265,705 B1 * | 7/2001 | Gardner, Jr. | 250/208.1 |
| 6,331,714 B1 * | 12/2001 | Gardner, Jr. et al. | 250/559.29 |
| 6,366,707 B1 * | 4/2002 | Gardner, Jr. et al. | 382/287 |
| 6,457,645 B1 * | 10/2002 | Gardner, Jr. | 235/462.23 |

FOREIGN PATENT DOCUMENTS

| | | | |
|---|---|---|---|
| EP | 1045268 A2 | 10/2000 | |
| EP | 1045569 A2 | 10/2000 | |

OTHER PUBLICATIONS

EPO Search Report dated Jun. 29, 2004 (1 page) for corresponding EPO Application No. EP01127072.
Patent Abstract of Japanese Publication No. 2000–155252 published Jun. 6, 2000 for "Lens Cell Fixing Structure" of Ricoh Co. LTD (2 pages).

* cited by examiner

*Primary Examiner*—Jay Patidar (57) ABSTRACT

An improved lens focusing and referencing arrangement for an imaging system of the type which may include a photosensor array. The imaging system housing may include reference surfaces configured such that they contact the lens only near the ends thereof in order to minimize the effect of any irregularities in the reference surfaces.

17 Claims, 10 Drawing Sheets

IMAGING APPARATUS HAVING DISCONTINUOUS LENS REFERENCE SURFACES AND METHOD OF ASSEMBLING THE IMAGING APPARATUS

FIELD OF THE INVENTION

The present invention relates generally to imaging systems and, more specifically, to imaging systems of the type having a photosensor and at least one lens associated therewith.

BACKGROUND OF THE INVENTION

Imaging devices are used to produce machine-readable data which is representative of the image of an object, e.g. a page of printed text. One type of imaging device is a photoelectric imaging device. As used herein, the phrase "photoelectric imaging device" means any device that generates data representative of an imaged object through use of a photosensor array such as a charge coupled device (CCD). Examples of photoelectric imaging devices include devices such as camcorders and digital cameras which instantaneously focus an entire image which is to be captured onto a two-dimensional photosensor array. Another example of a photoelectric imaging device is a line-focus system.

Some line-focus systems image an object by sequentially focusing narrow "scan line" portions of the object onto a linear photosensor array by sweeping a scanning head over the object. Examples of such devices, commonly referred to as optical scanners, include computer input devices usually referred to simply as "scanners" as well as facsimile machines and digital copy machines.

A line-focus system is also used in some barcode readers. Generally, in line-focus barcode readers, a narrow portion of a barcode is imaged onto a linear photosensor array. Electrical output from the photosensor array may then be analyzed to read the imaged barcode. Examples of imaging devices that are useable in conjunction with barcode readers are disclosed in U.S. Pat. No. 6,118,598 of Gardner, Jr. for METHOD AND APPARATUS FOR SETTING FOCUS IN AN IMAGING DEVICE and in U.S. patent application Ser. No. 09/290,216 filed on Apr. 13, 1999, of Gardner, Jr. for ALIGNMENT APPARATUS AND METHOD FOR AN IMAGING SYSTEM, which are both hereby specifically incorporated by reference for all that is disclosed therein.

In a line-focus system, a light beam from an illuminated line object is imaged by a lens onto a linear photosensor array which is positioned remotely from the line object. The linear photosensor array is a single dimension array of photoelements that correspond to small area locations on the line object. These small area locations on the line object are commonly referred to as "picture elements" or "pixels." In response to light from its corresponding pixel location on the line object, each photosensor pixel element in the linear photosensor array (sometimes referred to simply as "pixels") produces a data signal that is representative of the light intensity that it experiences during an immediately preceding interval of time known as a sampling interval. All of the photoelement data signals are received and processed by an appropriate data processing system.

In a color optical scanner, a plurality of spectrally separated imaging beams (typically red, green and blue beams) must be projected onto a photosensor array or arrays. The construction and operation of color optical scanners is fully disclosed in the following U.S. Pat. No. 4,870,268 of Vincent et al. for COLOR COMBINER AND SEPARATOR AND IMPLEMENTATIONS; U.S. Pat. No. 4,926,041 of Boyd for OPTICAL SCANNER (and corresponding EPO patent no. 0410578); U.S. Pat. No. 5,019,703 of Boyd et al. for OPTICAL SCANNER WITH MIRROR MOUNTED OCCLUDING APERTURE OR FILTER (and corresponding EPO patent no. 0438868); U.S. Pat. No. 5,032,004 of Steinle for BEAM SPLITTER APPARATUS WITH ADJUSTABLE IMAGE FOCUS AND REGISTRATION (and corresponding EPO patent no. 0458492); 5,044,727 of Steinle for BEAM SPLITTER/COMBINER APPARATUS (and corresponding EPO patent no. 0455450); U.S. Pat. No. 5,040,872 of Steinle for BEAM SPLITTER/COMBINER WITH PATH LENGTH COMPENSATOR; 5,227,620 of Elder, Jr. et al. for APPARATUS FOR ASSEMBLING COMPONENTS OF COLOR OPTICAL SCANNERS (and corresponding EPO patent no. 0576788) and U.S. Pat. No. 5,410,347 of Steinle et al. for COLOR OPTICAL SCANNER WITH IMAGE REGISTRATION HOLDING ASSEMBLY, which are all hereby specifically incorporated by reference for all that is disclosed therein.

In imaging devices and particularly in a line-focus type imaging device as described above, it is preferable for accurate imaging that the light beam from the object be accurately aligned with the photosensor array. In a typical line-focus scanning device, before reaching the photosensor array, the imaging light beam is transmitted by one or more optical components, e.g., a lens. Even a slight mis-alignment between any of these optical components and the photosensor array can cause a serious mis-alignment between the light beam and the photosensor array and result in a corresponding degradation in imaging quality.

Scanning devices that include light beam alignment features are fully described in U.S. Pat. No. 5,646,394 of Steinle et al. for IMAGING DEVICE WITH BEAM STEERING CAPABILITY and in U.S. Pat. No. 6,147,343 of Christensen for PHOTOELECTRIC IMAGING METHOD AND APPARATUS, which are both hereby specifically incorporated by reference for all that is disclosed therein.

Typically, the optical components in an imaging device are mounted within an imaging device housing. The photosensor array is typically mounted to a circuit board, which, in turn, is mounted to the imaging device housing. A lens is also typically mounted within the imaging device housing. The lens serves to focus an image of an object onto the photosensor array. In order for the imaging device to function properly, the focus of the lens must be accurately set.

After an imaging device is assembled, the focus of the lens is generally adjusted. Typically, this is done by adjusting the distance between the lens and the photosensor array, i.e., the image distance of the optical system, until the proper focus is achieved. To accomplish this, imaging devices are commonly provided having a reference surface or surfaces for locating the lens. These reference surfaces typically allow the lens to translate in only one degree of movement, i.e., in directions toward or away from the photosensor array, but prevent the lens from being displaced in other directions. Such displacement, if allowed to occur, would otherwise result in misalignment of the lens with respect to the photosensor array. The reference surfaces, thus, allow the focus of the lens to be adjusted while maintaining the alignment between the lens and the photosensor array. Lens reference surfaces, as outlined above, may, for example, take the form of cylindrical surfaces or v-grooves.

Imaging devices also typically include a bracket or some other retention device to lock the lens in place against the reference surface or surfaces after the focus of the imaging system has been set. The bracket may, for example, be secured by a screw. Accordingly, the screw may be loosened when it is desired to move the lens in order to focus the system, and then tightened to lock the lens in place when the proper focus has been achieved.

Conventional retention devices have proven problematic in that they often result in misalignment of the lens during the focusing operation. With respect to the screw retention bracket described above, for example, if the screw is loosened too much prior to the focusing operation, then the lens may be permitted to rotate away from the reference surface or surfaces, thus resulting in misalignment. Also, it is often difficult to sufficiently tighten the screw to lock down the lens after the focusing operation is complete. As a result, the lens may tend to move out of its focused position, even after it has been locked down. Further, it has been found that the torque applied to tighten the retention screw or screws is sometimes transferred to the lens, causing it to rotate out of alignment.

Conventional retention devices have also proven problematic in that they are not readily conducive to adjustment with an automated focus adjustment apparatus, as is commonly used to set the focus in imaging devices.

SUMMARY OF THE INVENTION

Accordingly, it would be desirable to provide an optical imaging device that provides for accurate alignment between a photosensor array and the other optical components in the device.

An imaging apparatus for producing machine-readable data representative of an imaged object is disclosed. The imaging apparatus may include an imaging apparatus housing, the imaging apparatus housing including at least one first reference surface and at least one second reference surface. The at least one first reference surface is coplanar with the at least one second reference surface. The at least one first reference surface is discontinuous with the at least one second reference surface. At least one lens assembly may be in contact with both the at least one first and at least one second reference surfaces.

Also disclosed is a method of assembling an imaging apparatus for producing machine-readable data representative of an imaged object. The method may include providing an imaging apparatus housing having at least one first reference surface and at least one second reference surface and providing at least one lens. The at least one first reference surface is coplanar with the at least one second reference surface and the at least one first reference surface is discontinuous with the at least one second reference surface. The method may further include using the at least one first reference surface and the at least one second reference surface to align the lens with the imaging apparatus housing.

DETAILED DESCRIPTION OF THE INVENTION

Disclosed herein is an improved lens focusing and holding arrangement for an imaging system of the type that may include a photosensor array. The lens may be in contact with reference surfaces formed within the imaging system housing and may be translatable along the reference surfaces in directions toward and away from the photosensor array in order to adjust the focus of the imaging system.

The reference surfaces may be configured such that they contact the lens only near the ends thereof. To accomplish this, a recessed area may be provided near the center of the lens. Restricting contact to the outer portions of the lens minimizes the effect that any irregularities in the reference surfaces might otherwise have on alignment.

A lens retention clip may be provided to secure the lens within the imaging system housing. The lens retention clip may remain stationary while the lens is translated during the focusing operation. After the desired focus has been achieved, the lens retention clip may be fastened in place, e.g., with retention screws, such that it plastically deforms in order to securely hold the lens in the desired position. The lens retention clip may include anti-rotation tabs that cooperate with anti-rotation ribs on the housing to prevent torque applied to the retention screws from causing rotation of the lens retention clip.

The imaging system housing may include spaced support members that support the lens retention clip when it is first installed. A first torque may be applied to the lens retention clip retention screws in order to cause a portion of the lens retention clip to deflect downwardly between the support members. This deflection causes the lens retention clip to be securely located during the focus adjusting operation. After focus is set, a higher level of torque may be applied to the retention screws in order to lock the lens in place.

The lens reference surfaces and the photosensor reference surfaces may be integrally formed into a structure so that alignment between the lens reference surface and the photosensor reference surface, as well as the alignment between these reference surfaces and the structure itself may readily be accomplished and maintained.

FIGS. 1–13 generally illustrate an imaging apparatus 60 for producing machine-readable data representative of an imaged object 32. The imaging apparatus 60 may include an imaging apparatus housing 100, the imaging apparatus housing including at least one first reference surface 324, 354 and at least one second reference surface 326, 356. The at least one first reference surface 324, 354 is coplanar with the at least one second reference surface 326, 356. The at least one first reference surface 324, 354 is discontinuous with the at least one second reference surface 326, 356. At least one lens assembly 210 may be in contact with both the at least one first 324, 354 and at least one second 326, 356 reference surfaces.

FIGS. 1–13 also illustrate, in general, a method of assembling an imaging apparatus 60 for producing machine-readable data representative of an imaged object 32. The method may include providing an imaging apparatus housing 100 having at least one first reference surface 324, 354 and at least one second reference surface 326, 356 and providing at least one lens 210. The at least one first reference surface 324, 354 is coplanar with the at least one second reference surface 326, 356 and the at least one first reference surface 324, 354 is discontinuous with the at least one second reference surface 326, 356. The method may further include using the at least one first reference surface 324, 354 and the at least one second reference surface 326, 356 to align the lens 210 with the imaging apparatus housing 100.

Having thus described the apparatus and method in general, they will now be described in further detail.

Figure 1:
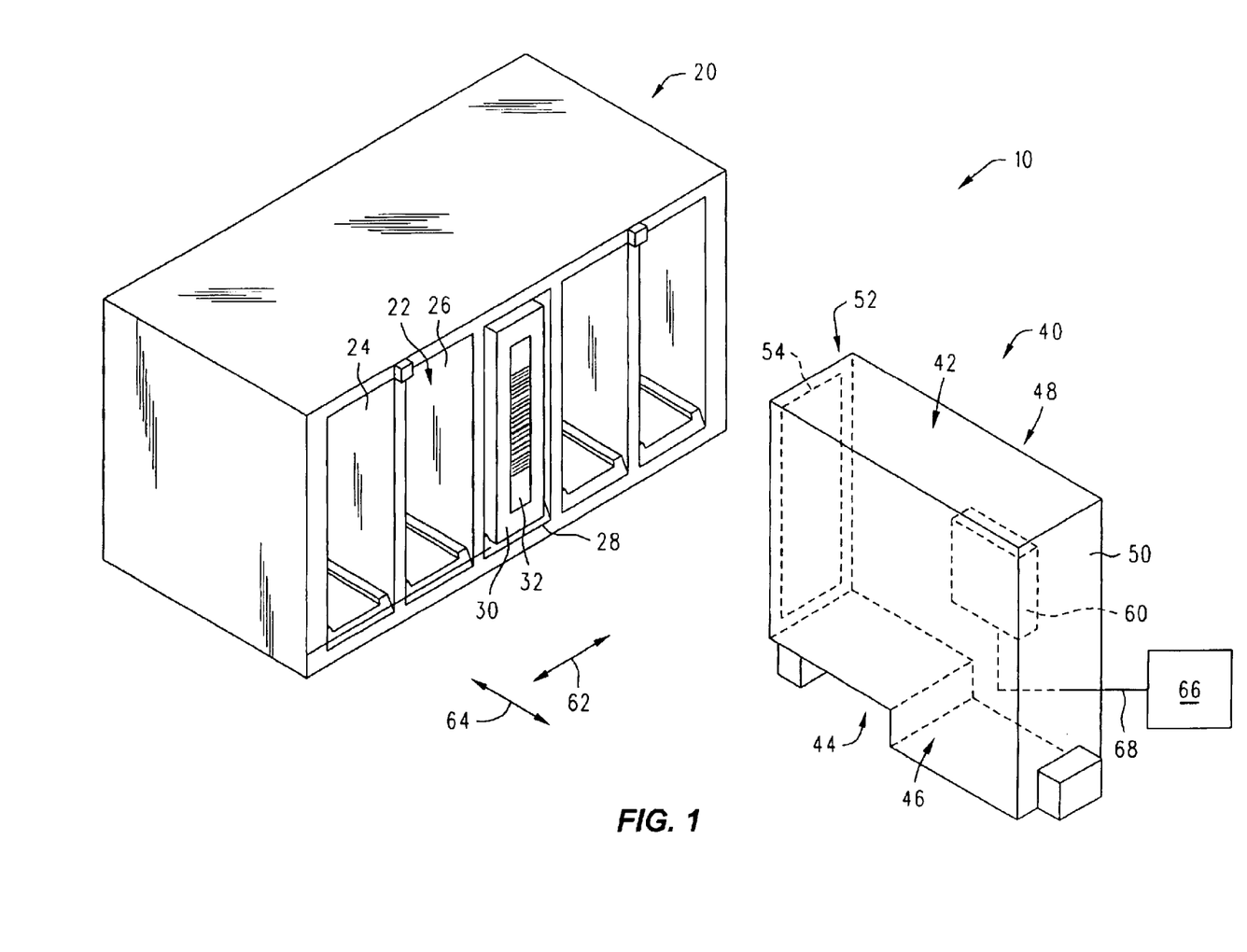
FIG. 1 is a perspective view of a media library device including a media handling device and a media magazine.

FIG. 1 schematically illustrates a media library device 10. Media library device 10 may include at least one media magazine 20 and at least one media handling device 40. Magazine 20 may include a plurality of slots 22, such as the individual slots 24, 26, 28. The slots 22 may be adapted to receive media storage devices, such as the media storage device 30 shown housed within the slot 28 in FIG. 1. Media storage device 30 may be any type of media storage device. Media storage device 30 may, for example, be a conventional digital linear tape cartridge. Media storage device 30 may include a bar code label 32 affixed thereto for the purpose of uniquely identifying the media storage device 30.

Media handling device 40 may be in the form of a generally parallelepiped structure having a top wall 42, an oppositely disposed bottom wall 44, a left sidewall 46 and an oppositely disposed right sidewall 48, a rear wall 50 and an oppositely disposed front wall 52. Front wall 52 may include a generally rectangular opening 54 therein. An imaging device 60 which may, for example, be a barcode reader, may be mounted to the inside surface 80 (e.g., FIG. 2) of the media handler sidewall 46 as shown. Imaging device 60 may be attached to a computer processor 66 via a data connection 68.

In operation, the media handling device 40 is moveable in a transverse direction 62 relative to the media magazine 20. In this manner, the media handling device 40 may be selectively positioned adjacent any of the slots 22 of the media magazine 20. A plunger mechanism, not shown, located within the media handling device 40 is moveable in a plunge direction 64 and is adapted to selectively engage a media storage device, such as the media storage device 30. In this manner, the media handling device 40 is able to move media storage devices between the media magazine 20 and one or more media playing/recording devices, not shown, located within the media library device 10. The imaging device 60 may serve to read barcode labels on the media storage devices, such as the barcode label 32 on the media storage device 30, in order to determine the identity of a specific media storage device.

Media library device 10 may be a conventional media library device and may, for example, be of the type disclosed in any of the following U.S. Pat. No. 6,194,697 of Gardner for CALIBRATION SYSTEM FOR AN IMAGING APPARATUS AND METHOD and U.S. Pat. No. 6,164,543 of Kato et al. for METHOD OF DECIPHERING BAR CODES and in the following U.S. patent application Ser. No. 09/290,842 of Gardner for OPTICAL ASSEMBLY HAVING LENS OFFSET FROM OPTICAL AXIS, filed Apr. 13, 1999; Ser. No. 09/291,242 of Gardner et al. for GUIDANCE SYSTEM AND METHOD FOR AN AUTOMATED MEDIA EXCHANGER, filed Apr. 13, 1999; Ser. No. 09/290,429 of Gardner et al. for IMAGING APPARATUS ALIGNMENT SYSTEM AND METHOD, filed Apr. 13, 1999; Ser. No. 09/290,926 of Gardner, et al. for AUTOMATED OPTICAL DETECTION SYSTEM AND METHOD, filed Apr. 13, 1999 and Ser. No. 09/290,216 of Gardner for ALIGNMENT APPARATUS AND METHOD FOR AN IMAGING SYSTEM, filed Apr. 13, 1999, which are all hereby incorporated by reference for all that is disclosed therein.

Figure 2:
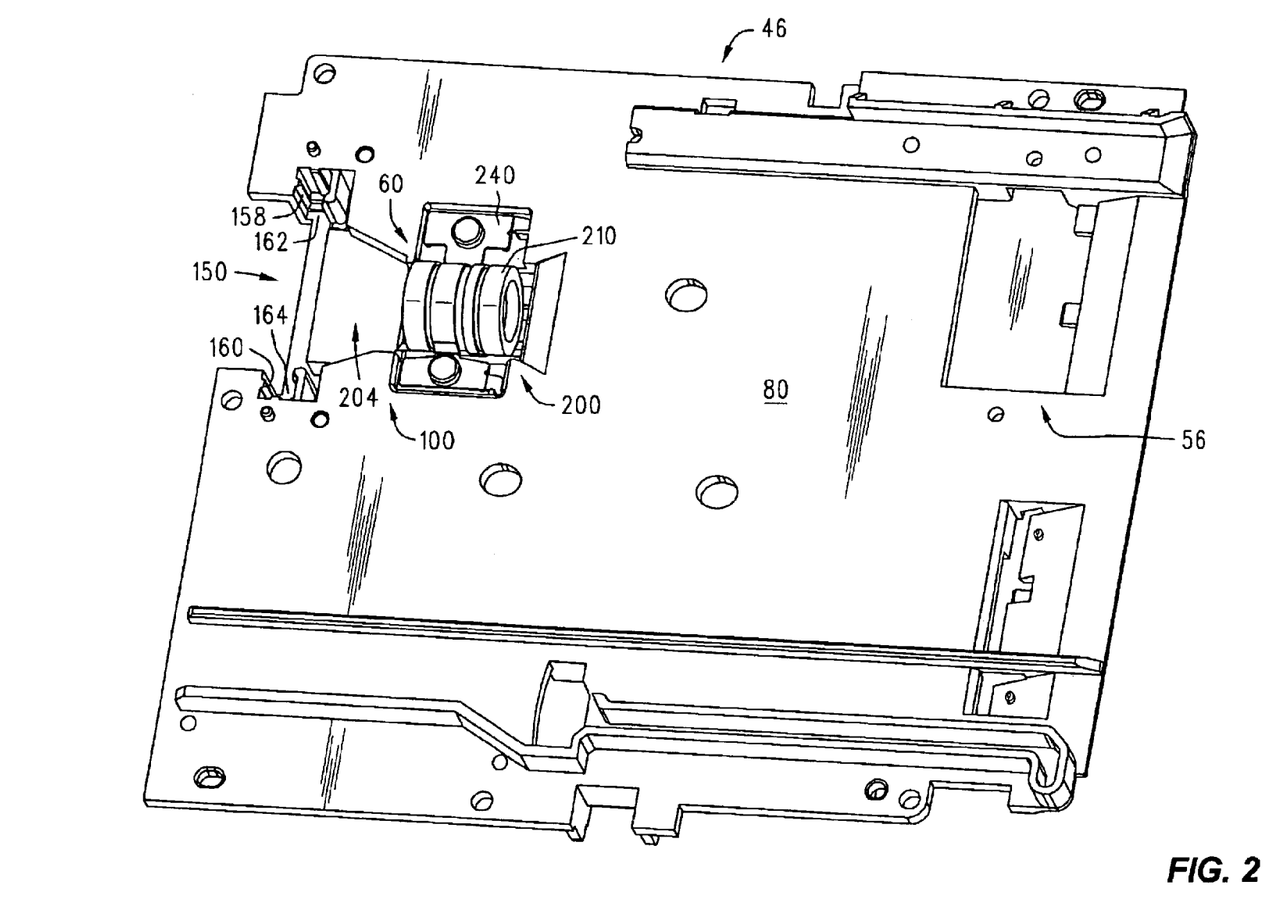
FIG. 2 is a perspective view of a wall portion of the media handling device of FIG. 1, showing a photosensor mounting area and a lens mounting area.

FIG. 2 illustrates the inner surface 80 of the media handling device sidewall 46 and the imaging device 60 in further detail. Referring now to FIG. 2, the sidewall 46 may include a light source mounting area 56, as shown. Light source mounting area 56 may serve to mount a conventional light source, e.g., an LED light source, for use in providing illumination to facilitate the reading of barcodes by the imaging device 60.

With further reference to FIG. 2, imaging device 60 may also include a housing 100. Housing 100 may generally include a photosensor mounting area 150 and a lens mounting area 200 in which a lens assembly 210 is shown mounted. As can be seen from FIG. 2, the lens assembly 210 may be retained by a lens clip 240.

Figure 12:
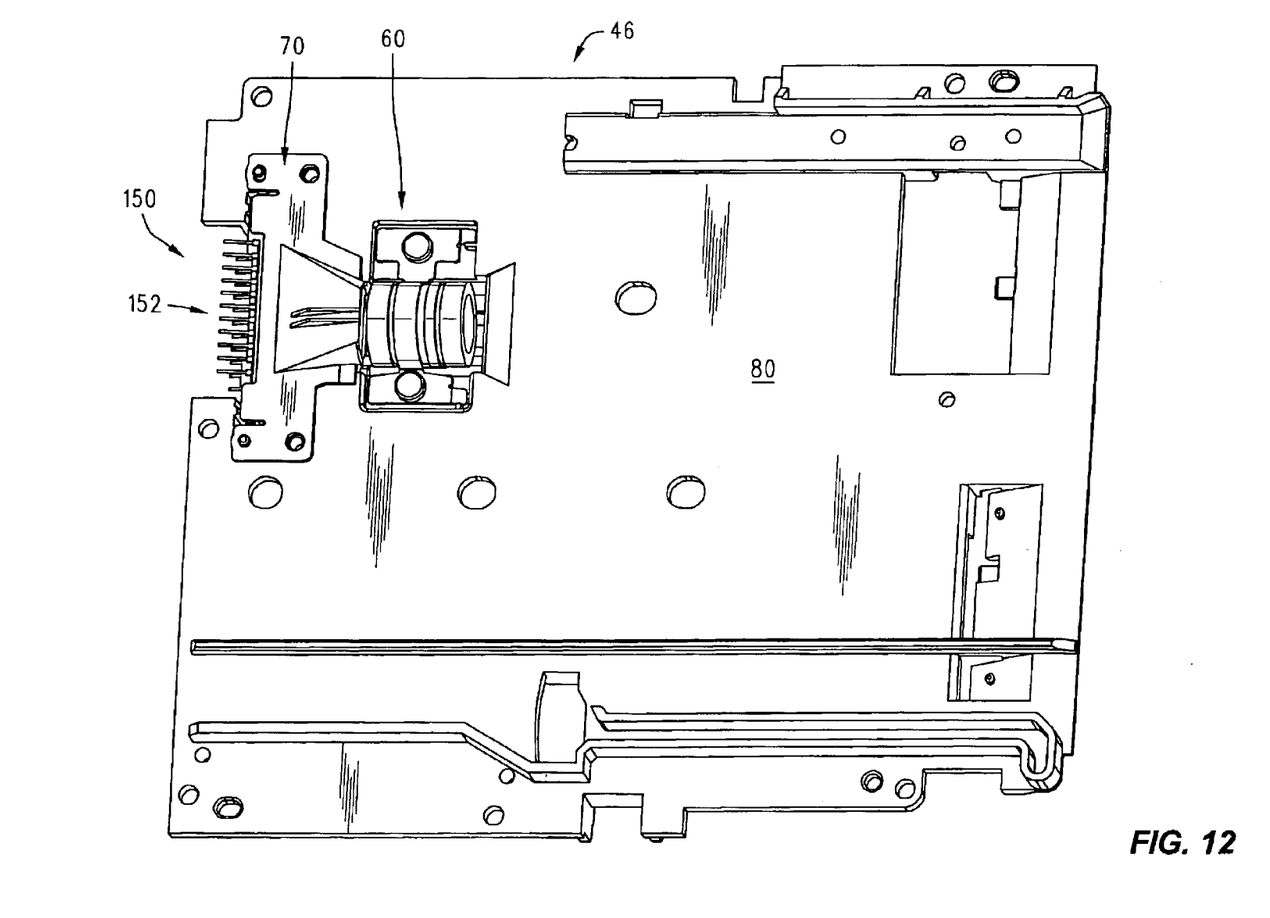
FIG. 12 is a perspective view showing a photosensor package and shroud mounted on the wall portion of FIG. 2.

Photosensor mounting area 150 may be provided to retain and align a photosensor package 152, FIG. 12, relative to the sidewall 46. In this manner, the photosensor mounting area 150 serves to align the photosensor package 152 with the lens assembly 210. Photosensor package 152 may, for example, be of the type commercially available from NEC Corporation of Japan and sold as Model No. uPD3734A. Photosensor mounting area 150 may include various reference surfaces, such as the reference surfaces 158, 160, 162, 164 for aligning the photosensor package with the photosensor mounting area 150 and, thus, also with the sidewall 46, the light source mounting area 56 and the lens mounting area 200. Photosensor mounting area 150 may, for example, be substantially identical to the photosensor mounting area described in U.S. Pat. No. 6,118,598, previously referenced, except that the photosensor mounting area 150 is integrally formed into the sidewall 46 of the media handling device, whereas the photosensor mounting area disclosed in U.S. Pat. No. 6,118,598 is formed in a separate housing.

Figure 3:
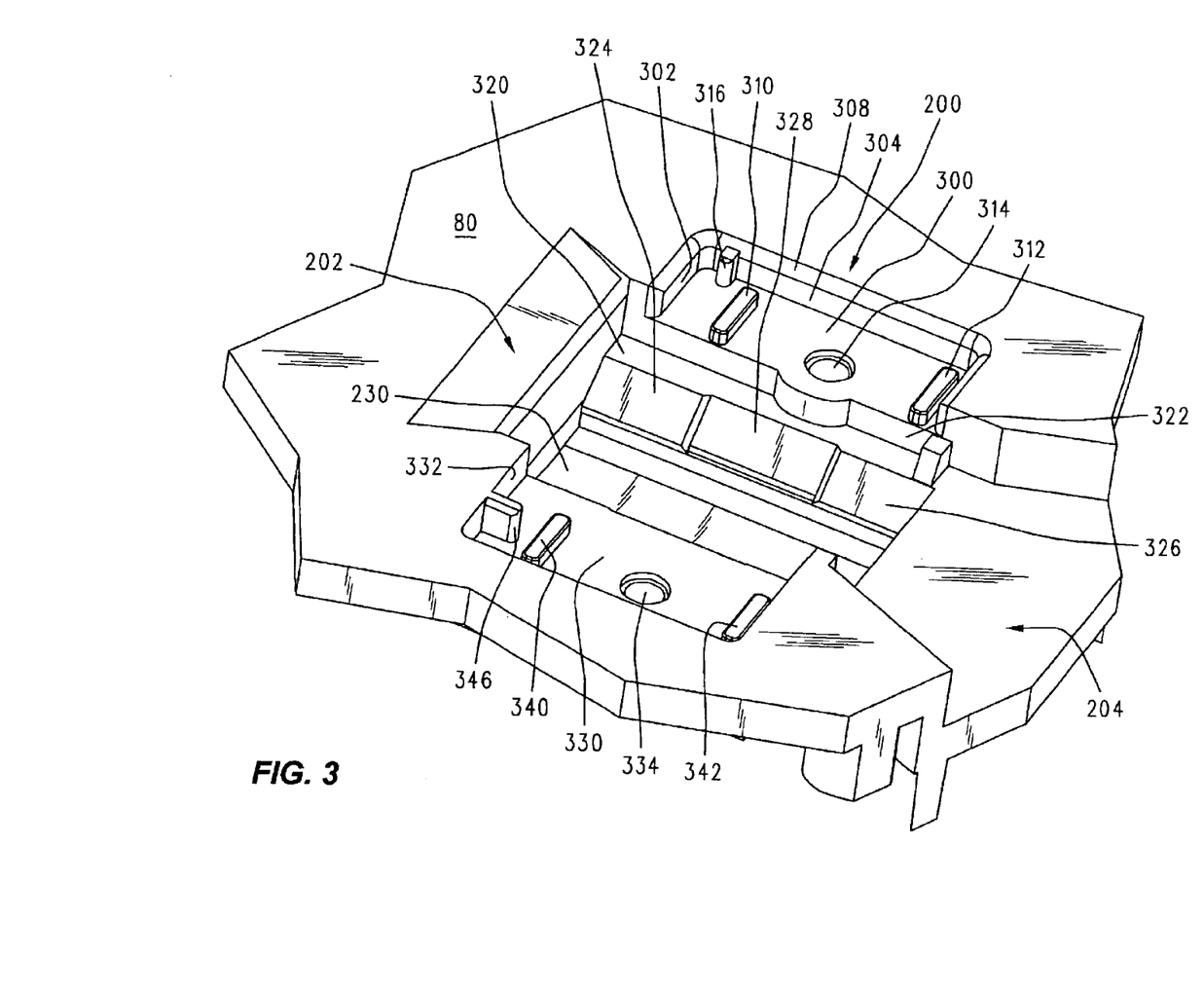
FIG. 3 is a detail perspective cutaway view of the lens mounting area of FIG. 2 with the lens assembly and lens retention clip member removed for clarity.
Figure 4:
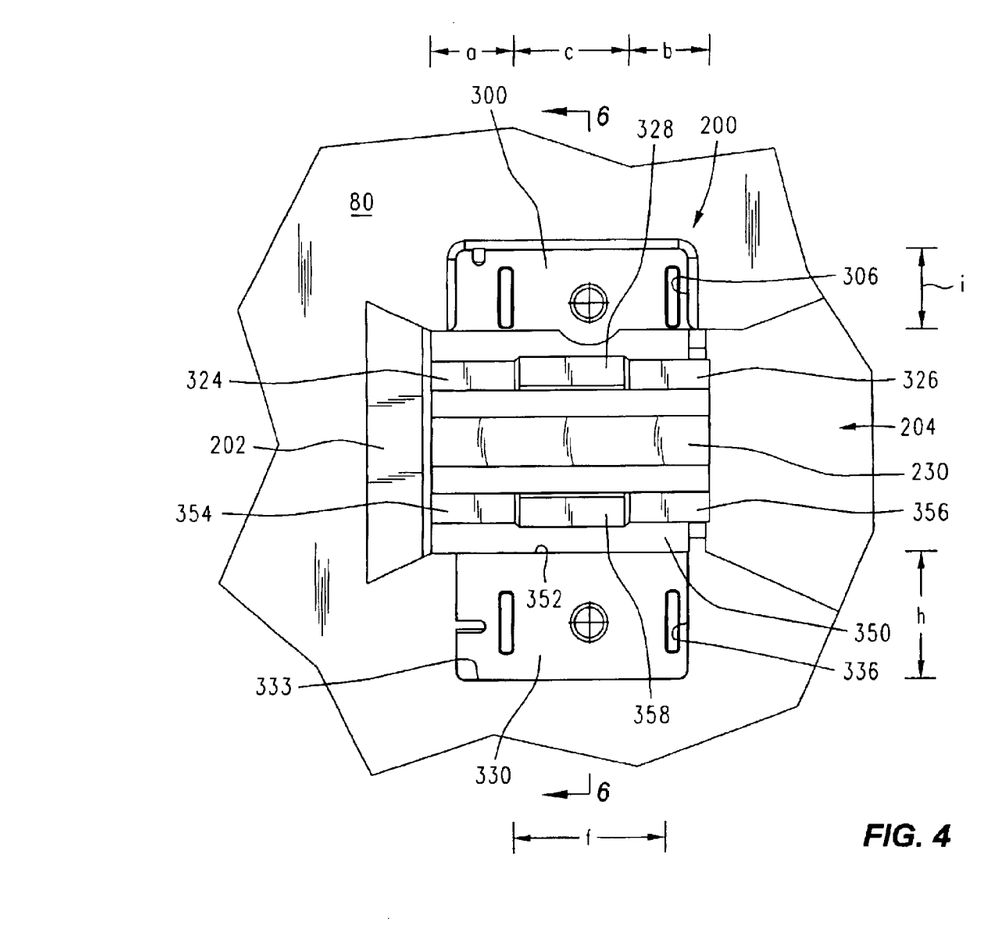
FIG. 4 is a plan view of the lens mounting area detailed in FIG. 3.

FIG. 3 illustrates a detail cutaway perspective view of the lens mounting area 200 of FIG. 2, with the lens assembly 210 and lens retention clip member 240 removed for clarity. FIG. 4 is similar to FIG. 3 but illustrates the lens mounting area in a plan view. Referring now to FIGS. 3 and 4, the lens mounting area 200 may be a generally parallelepiped-shaped recess integrally formed within the sidewall 46 of the media handling device 40. Lens mounting area 200 may include a first lower surface 300 and a second lower surface 330.

First lower surface 300 may be substantially parallel to the inner surface 80 of the sidewall 46. A first front wall 302, a first sidewall 304 and a first rear wall 306 (FIG. 4) may generally extend between the first lower surface 300 and the inner surface 80 of the sidewall 46, as shown. Radiused portions may transition between the inner surface 80 and the first front wall 302, the first sidewall 304 and the first rear wall 306 as indicated, for example, with respect to the radiused portion 308 extending between the inner surface 80 and the first sidewall 304. These radiused portions may be present in order to provide clearance for moving parts within the media handling device 40. A pair of support members 310, 312 may extend from the first lower surface 300, as shown. Support members 310, 312 may for example extend for a distance of about 1 mm above the first lower surface 300 and may be separated by a distance "f", FIG. 4. The distance "f" may, for example, be about 14.5 mm. A hole 314 may be provided in the first lower surface 300, as shown. An anti-rotation rib 316 may extend transversely from the first sidewall 304. An arcuate channel 230 may be provided in the lens mounting area 200 as shown, for example, in FIGS. 3 and 6 in order to provide clearance for the lens assembly 210.

Second lower surface 330 may be formed in a similar manner to the first lower surface 300 described above. Specifically, the second lower surface 330 may be substantially parallel to the inner surface 80 of the sidewall 46. A second front wall 332, a second sidewall 333 and a second rear wall 336 (FIG. 4) may generally extend between the second lower surface 330 and the inner surface 80 of the sidewall 46, as shown. A pair of support members 340, 342 may extend upwardly from the second lower surface 330, as shown. Support members 340, 342 may for example extend for a distance of about 1 mm above the second lower surface 330 and may be separated by the distance "f", FIG. 4, described above. A hole 334 may be provided in the second lower surface 300, as shown. An anti-rotation rib 346 may extend transversely from the second front wall 332.

Referring again to FIG. 3, a first ledge portion 320 may be substantially parallel to the first lower surface 300. A sidewall portion 322 may extend between the first lower surface 300 and the ledge portion 320, as shown. Ledge portion 320 may, for example, be located a distance of about 2.1 mm below the first lower surface 300. A first lens reference surface 324 and a second lens reference surface 326 may extend downwardly, at an acute angle, from the ledge portion 320, as shown. First lens reference surface 324 may be substantially coplanar with second lens reference surface 326. A first recessed surface 328 may be located between and recessed below the first lens reference surface 324 and the second lens reference surface 326. First recessed surface 328 may be substantially parallel to the first and second lens reference surfaces 324, 326 but may be spaced therefrom by a distance of about 0.51 mm.

A second ledge portion 350, FIG. 4, may be formed in a substantially identical manner to the first ledge portion 320 described above. Specifically, second ledge portion 350 may be substantially parallel to the second lower surface 330. A sidewall portion 352 may extend between the second lower surface 330 and the second ledge portion 350, as shown. Second ledge portion 350 may, for example, be located a distance of about 2.1 mm below the second lower surface 330. Third and fourth lens reference surfaces 354, 356, respectively, may, for example, be formed in a substantially identical manner to the first and second reference surfaces 324, 326, described above. Specifically, third lens reference surface 354 and fourth lens reference surface 356 may extend downwardly, at an acute angle, from the ledge portion 350. Third lens reference surface 354 may be substantially coplanar with the fourth lens reference surface 356. A second recessed surface 358 may be located between and recessed below the third lens reference surface 354 and the fourth lens reference surface 356. Second recessed surface 358 may be substantially parallel to the third and fourth lens reference surfaces 354, 356 but may be spaced therefrom by a distance of about 0.51 mm.

Referring to FIG. 4, first lens reference surface 324 and third lens reference surface 354 may each have a length "a" of, for example, about 7 mm. Second lens reference surface 326 and fourth lens reference surface 356 may each have a length "b" of, for example, about 6.8 mm. First recessed surface 328 and second recessed surface 358 may each have a length "c" of, for example, about 10 mm.

With further reference to FIGS. 3 and 4, the lens mounting area 200 may further include a tapered wall portion 202, as shown. Tapered wall portion 202 may be provided in order to facilitate transmission of the imaging light beam from the target (e.g., a barcode label) to the lens assembly 210, when the lens assembly is mounted within the lens mounting area 200 as illustrated, for example, in FIG. 2. The lens mounting area 200 may also include a channel 204. As can be seen from FIG. 2, the channel 204 may extend between the lens mounting area 200 and the photosensor mounting area 150 in order to allow an uninterrupted light path between the lens assembly 210 and the photosensor package 152, FIG. 12, mounted in the photosensor mounting area 150.

Figure 5:
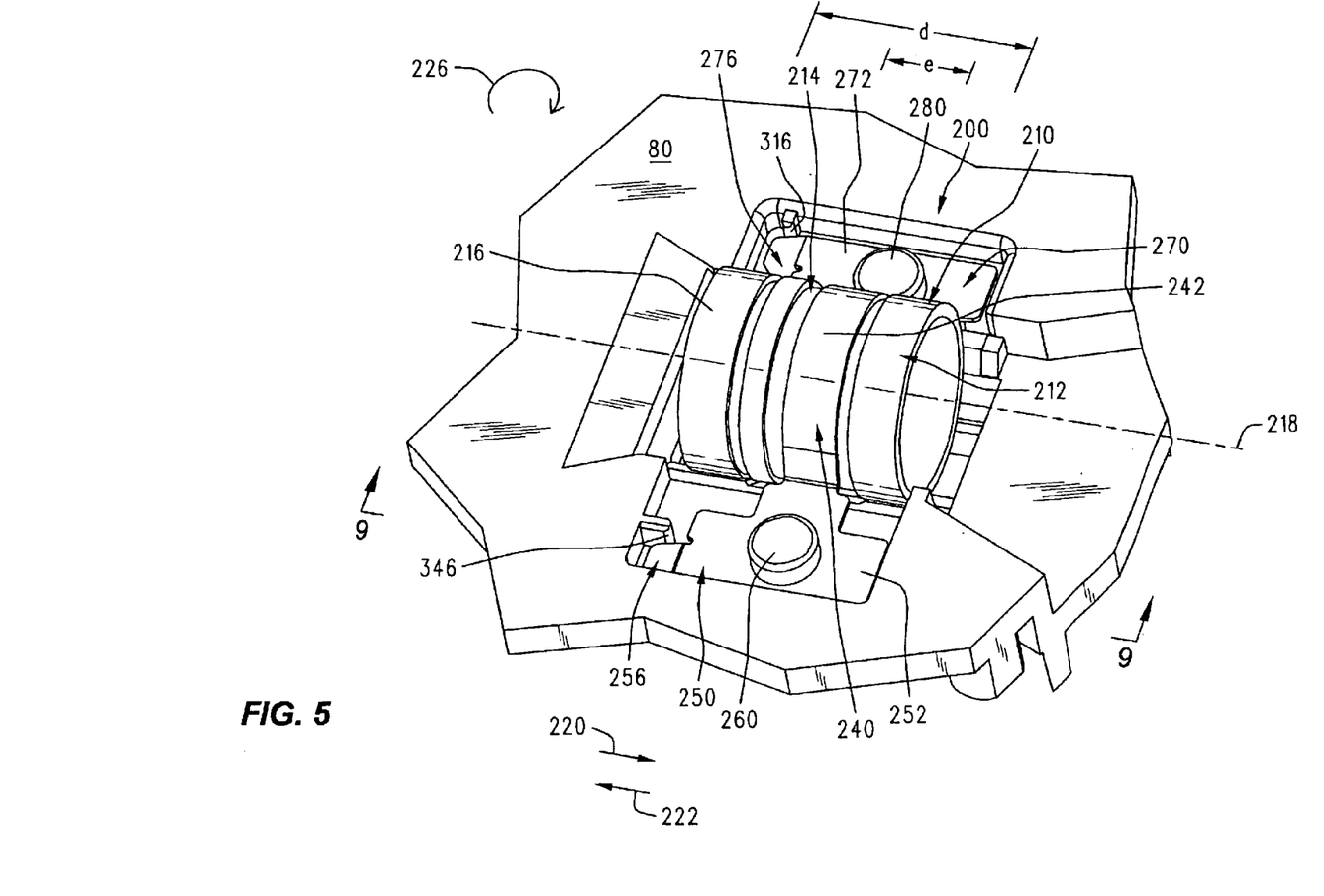
FIG. 5 is a detail perspective cutaway view of the lens mounting area of FIG. 2.

FIG. 5 is a detail cutaway perspective view of the lens mounting area 200 of FIG. 2. Referring now to FIG. 5, lens assembly 210 may generally include a housing 212 having an outer surface 216. One or more optical components, e.g., lens members, not shown, may be located within the housing 212 in a conventional manner. A recess 214 may be formed in the outer surface 216 of the housing 212, as shown. Lens assembly 210 may, have an optical axis 218, as shown. The lens assembly housing 212 may have a length "d" of, for example, about 18 mm. Recess 214 may have a length "e" of, for example, about 7 mm. Lens assembly 210 may, for example, be of the type commercially available from Pentax Technologies and sold as Part No. 81312.

Figure 6:
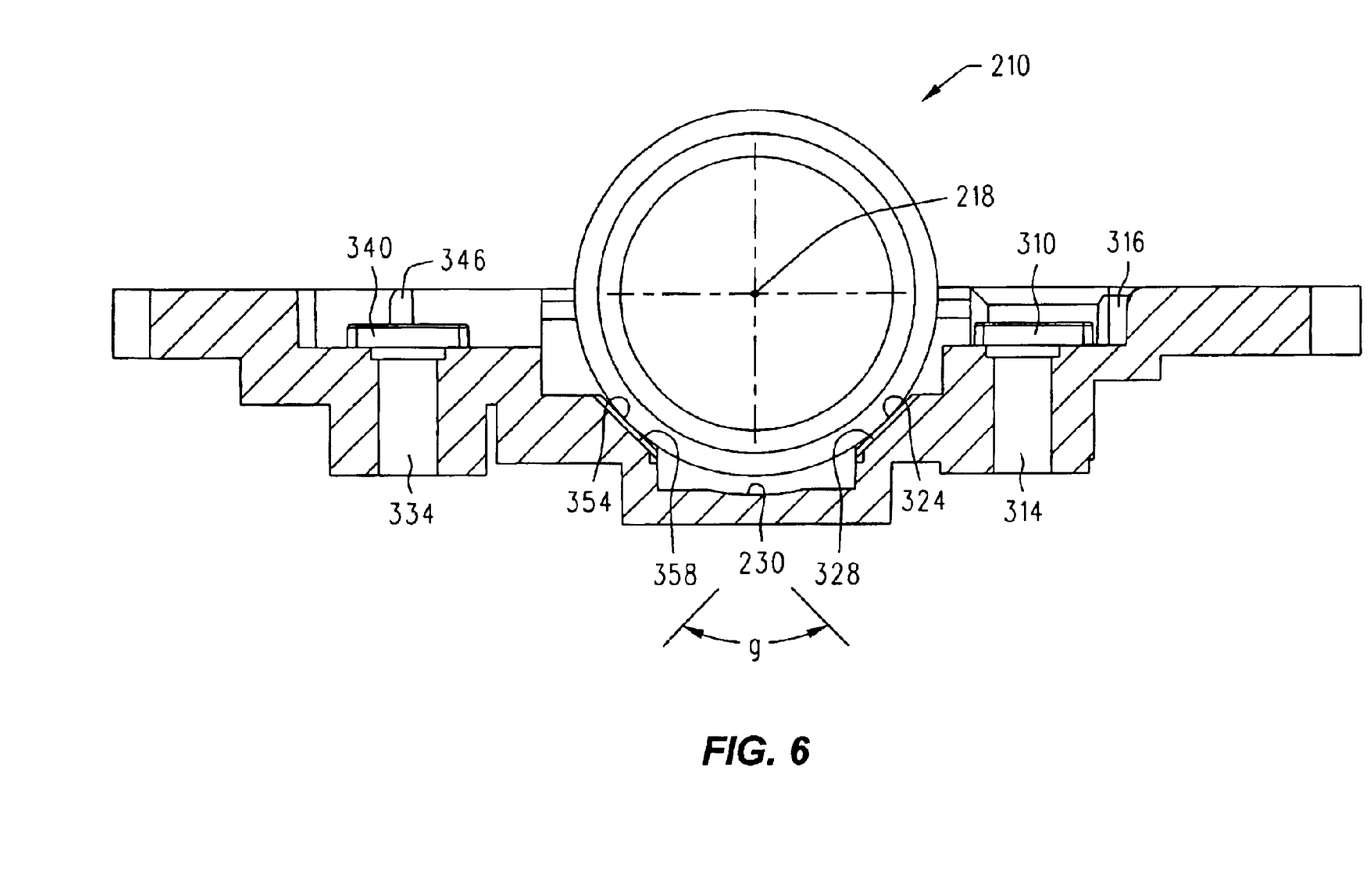
FIG. 6 is a cross-sectional view taken along the line 6—6 in FIG. 4 with the lens assembly added for illustration purposes.

FIG. 6 is a cross-sectional view taken along the line 6—6 in FIG. 4 and showing the lens assembly 210 supported within the lens mounting area 200. As can be seen from FIG. 6, the outer surface 216 of the lens assembly housing 212 is in contact only with the lens reference surfaces 324, 326, 354, 356 (only the surfaces 324, 354 are shown in FIG. 4). The lens assembly outer surface 216 does not contact the recessed surfaces 328, 358. With further reference to FIG. 6, the surfaces 324, 354 (as well as the surfaces 326, 356) form an angle "g" of about 90 degrees.

Referring again to FIG. 5, a lens retention clip member 240 may be provided as shown. As will be described in further detail herein, lens retention clip member 240 serves to retain the lens assembly 210 within the lens mounting area 200 of the housing 100. Lens retention clip member 240 also allows the focus of the imaging device 60 to be adjusted by translating the lens assembly 210 in the directions 220, 222. After the focus is adjusted, the lens retention clip member 240 may be locked in place such that the lens assembly 210 may no longer be translated and the focus of the imaging device 60 is set.

Referring to FIG. 5, lens retention clip member 240 may include an arcuate body portion 242 and a pair of wing portions 250, 270, as shown. The arcuate body portion 242 and the wing portions 250, 270 may all be integrally formed, for example, from stainless steel having a thickness of about 0.015 inch.

Figure 7:
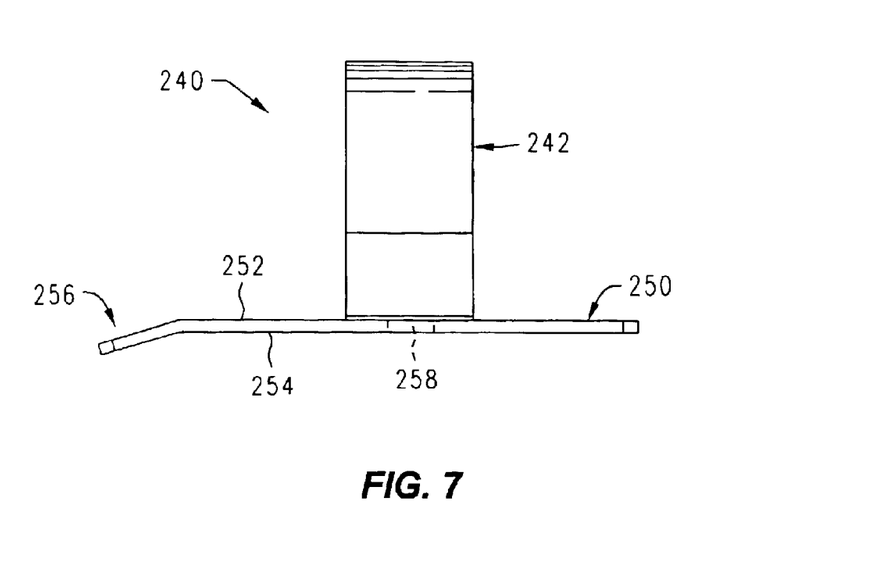
FIG. 7 is a side elevation view of a lens retention clip member useable in conjunction with the lens mounting area of FIG. 2.
Figure 8:
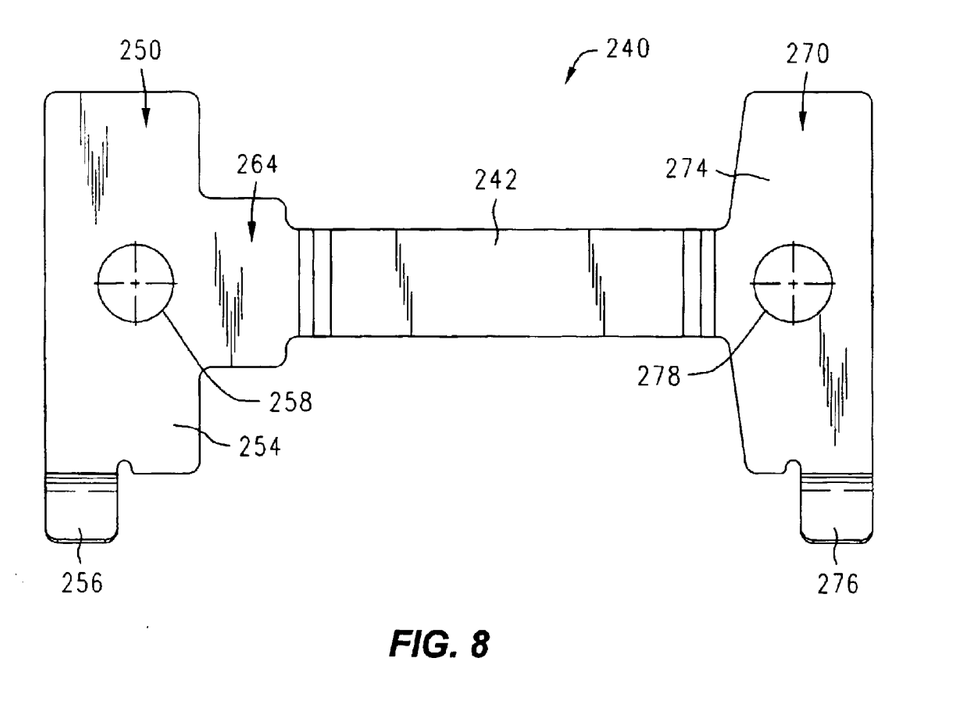
FIG. 8 is a bottom plan view of the lens retention clip member of FIG. 7.

Referring to FIGS. 7 and 8, wing portion 250 may have an upper surface 252 and an oppositely disposed lower surface 254. An anti-rotation tab 256 may extend from the forward edge of the wing portion 250. As best seen in FIG. 7, anti-rotation tab 256 may angle downwardly relative to the remainder of the wing portion 250. A hole 258 may extend completely through the wing portion 250. As best shown in FIG. 8, wing portion 250 may include an extension portion 264 adjacent the arcuate body portion 242.

Wing portion 270 may be formed in a substantially identical manner to the wing portion 250 described above, except that the wing portion 270 may omit an extension portion. Specifically, wing portion 270 may have an upper surface 272, FIG. 5, and an oppositely disposed lower surface 274, FIG. 8. An anti-rotation tab 276 may extend from the forward edge of the wing portion 270. In a similar manner to the anti-rotation tab 256 described above, the anti-rotation tab 276 may angle downwardly relative to the remainder of the wing portion 270. A hole 278 may extend completely through the wing portion 270 in a similar manner to the hole 258 in the wing portion 250.

Referring to FIG. 4, it is noted that the width "h" of the lens mounting area second lower surface 330 may be longer than the width "i" of the first lower surface 300 in order to accommodate wing portion 250, FIG. 8, which is longer than the wing portion 270 due to the inclusion of the extension 264 on the wing portion 250, as described above.

The lens retention clip member 240 serves to retain the lens assembly 210 within the lens mounting area 200 of the housing 212 after the focus of the imaging device has been adjusted by translating the lens assembly. This focusing operation will now be described in detail.

Figure 13:
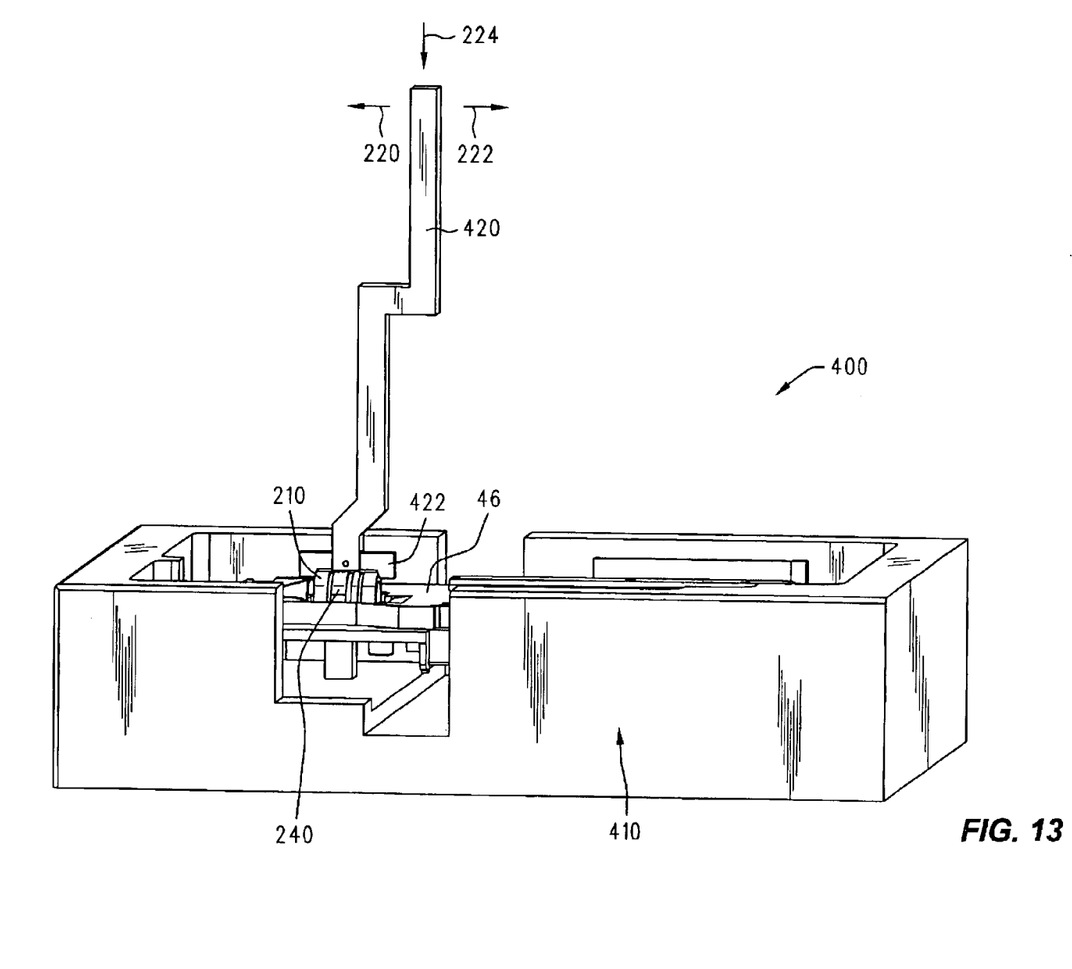
FIG. 13 is a perspective view of a focus setting device.

FIG. 13 schematically illustrates a focus setting device 400 which may be used to set the focus of the imaging device 60. Focus setting device 400 may generally include a fixture 410 and a moveable arm 420. The fixture 410 is adapted to securely hold the sidewall 46 of the media handling device 40, as shown. Moveable arm 420 may be adapted to move in the directions indicated by the arrows 220, 222 and may include a transverse portion 422 which is adapted to engage the lens assembly 210, as shown.

Figure 9:
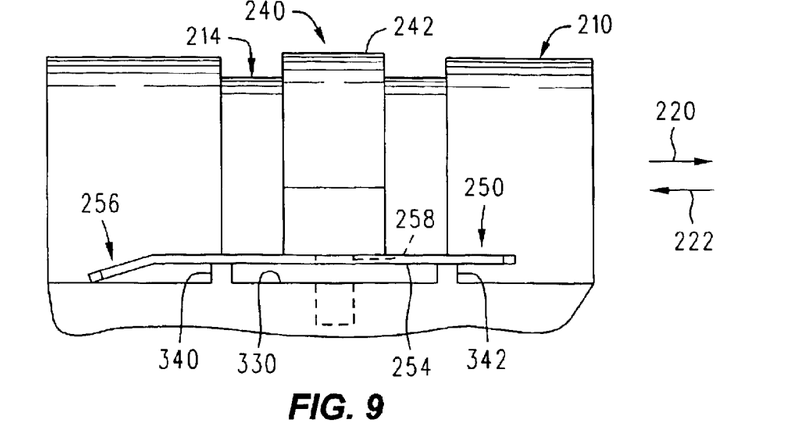
FIG. 9 is a partial cross-sectional cutaway view taken along the line 9—9 in FIG. 5, but illustrating a condition before the retaining screws have been inserted.

To set the focus of the imaging device 60, the sidewall 46 may be placed into the fixture 410 of the focus setting device 400, as shown in FIG. 13. The lens assembly 210 may be placed into the lens mounting area 200 such that it is supported on the lens reference surfaces 324, 326, 354, 356, FIGS. 3 and 4. The lens retention clip member 240 may then be placed over the lens assembly 210. This condition is illustrated in FIG. 9. As can be seen from FIG. 9, the lower surface 254 of the lens retention clip member wing portion 250 is resting on the support members 340, 342. In a similar manner, although not shown in FIG. 9, the lower surface of the lens retention clip member wing portion 270 is resting on the support members 310, 312, FIG. 3, and the holes (e.g., the hole 258, FIG. 7) in the lens retention clip member wings 250, 270 are aligned with the holes 334, 300 in the housing 200, FIG. 3.

Figure 10:
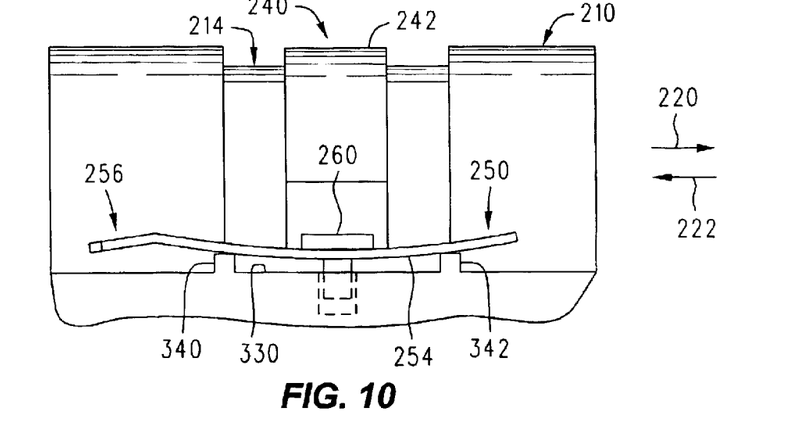
FIG. 10 is a view similar to FIG. 9, but illustrating a condition after the retaining screws have been inserted and tightened to a first level

Next, a pair of screws 260, 280, FIG. 5, may be inserted through the holes in the lens retention clip member wing portions 250, 270, respectively, and threadingly engaged within the holes 334, 314, respectively in the housing 200, FIG. 3. FIG. 10 illustrates a situation where a first predetermined level of torque has been applied to the screws 260, 280. This first level of torque may, for example, be about 1 inch-pound. As can be seen, the torque applied to the screw 260 has caused the wing portion 250 to deform downwardly between support members 340, 342 and, consequently, the outer portions of the wing portion 250 (including the anti-rotation tab 256) to deflect upwardly. Although not shown in FIG. 10, the torque applied to the screw 280 also causes the wing portion 270 to deform downwardly between the support members 310, 312 and, consequently, the outer portions of the wing portion 270 (including the anti-rotation tab 276) to deflect upwardly.

The lens retention clip member 240 may be sized such that, in the condition illustrated in FIG. 10, the arcuate body portion 242 of the lens retention clip member will not be in contact with the lens assembly 210. Accordingly, the lens assembly 210 can still be translated in the directions 220, 222 to accomplish focusing of the lens assembly. Causing the lens retention clip member wing portions 250, 270 to deflect downwardly between the support members 340, 342 and 310, 312, respectively, is advantageous in that this tightly holds the lens retention clip member 240 in place during the focusing operation and prevents, for example, the lens retention clip member 240 from rocking and potentially digging into the lens assembly 210 as the lens assembly 210 is translated during the focusing operation. As can be appreciated, the support members 310, 312, 340, 342, e.g., FIG. 3, facilitate the ability to slightly deflect the lens clip member wing portions 250, 270 as described above.

Thereafter, the transverse portion 422 of the moveable arm 420, FIG. 13, may be moved into contact with the lens assembly 210. As can be appreciated, once such contact is established, the moveable arm 420 may be used to move the lens assembly 210 in the directions 220, 222 to adjust the focus of the imaging device 60. During this translational movement, a slight downward force, in the direction 224, may be imparted to the lens assembly 210 by the moveable arm 420. This downward force ensures contact between the lens assembly housing 212, FIG. 5, and the lens reference surfaces 324, 326, 354, 356, FIGS. 3 and 4. This contact, in turn, maintains the alignment of the lens assembly optical axis 218, FIG. 5, relative to the photosensor package 152, FIG. 12.

Figure 11:
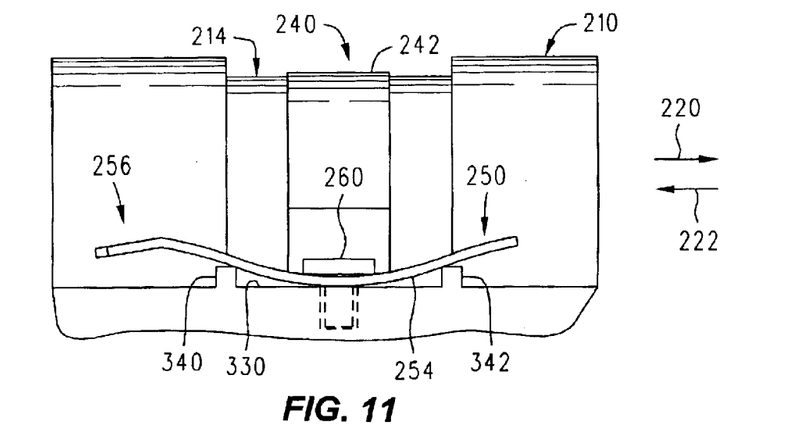
FIG. 11 is a view similar to FIGS. 9 and 10, but illustrating a condition after the retaining screws have been inserted and tightened to a second level.

FIG. 11 illustrates a condition in which, after focusing of the lens assembly 210 has been completed, the lens retention clip member may be used to lock the lens assembly 210 in position. To accomplish this, a second predetermined level of torque may be applied to the screws 260, 280, causing the lens retention clip member (and, particularly, the extension 264 on the lens retention clip member wing portion 250, FIG. 8) to plastically deform such that the arcuate portion 242 of the lens retention clip member forcefully contacts the lens assembly 210 and applies a downward force thereto in order to tightly lock the lens assembly in place. This second level of torque may, for example, be about 5 inch-pounds. As can be seen from FIG. 11, in this condition, the lower surface 254 of the lens retention clip member wing portion 250 may actually contact the second lower surface 330 of the lens mounting area 200. In a similar manner, although not shown in FIG. 11, the lower surface 274 of the lens retention clip member wing portion 270 may actually contact the first lower surface 300 of the lens mounting area 200.

It is noted that the focusing operation has been described above using the automated focus setting device 400 for exemplary purposes only. In practice, translational movement of the lens assembly 210 could, alternatively, be accomplished using any other type of automated focus setting device or using a manual process.

As described previously, it is preferable in imaging devices that the optical axis of the lens be accurately aligned with the photosensor package. Even a slight misalignment between the lens and the photosensor package can cause a serious mis-alignment between the light beam and the photosensor package and result in a corresponding degradation in imaging quality. With respect to the lens assembly 210 described above, for example, it is preferred that the optical axis 218, FIG. 5, remain perpendicular to the photosensor package 152, FIG. 12, of the imaging device 60. The lens mounting area 200 described above enhances the ability to maintain the desired alignment between the lens assembly 210 and the photosensor array of the imaging device in a manner as will now be described in detail.

The purpose of the lens assembly reference surfaces 324, 326, 354, 356 is to accurately locate and orient the lens assembly 210 relative to the photosensor package 152, FIG. 12, and thereby provide accurate alignment between the lens assembly 210 and the photosensor package 152 while allowing the lens assembly to be moved in the directions 220, 222, FIG. 5, to accomplish focusing of the lens.

Ideally, lens reference surfaces should make line contact with a cylindrical lens housing. In practice, however, it is extremely difficult to manufacture reference surfaces that are perfectly flat; slight imperfections will almost always be present. It has been found that such imperfections can negatively impact the alignment of the lens assembly. Specifically, such imperfections can cause the optical axis of the lens assembly to tilt relative to the desired orientation and, thus, not be perpendicular to the photosensor array.

It has also been found, however, that such imperfections have a smaller effect on lens assembly alignment when they exist near the ends of the lens assembly (as opposed to occurring nearer to the center of the lens assembly). The lens mounting area 200 described above prevents imperfections from existing near the center of the lens assembly by providing the recessed surfaces 328, 358 near the center of the lens. As previously described, these recessed surfaces 328, 358 do not contact the lens assembly 210; only the lens reference surfaces 324, 326, 354, 356 (which are located near the ends of the lens assembly 210) contact the lens assembly. Accordingly, the lens mounting area 200 described herein reduces the effects of reference surface imperfections on lens assembly alignment.

As previously described, it is preferable to maintain accurate alignment and positioning between the lens assembly 210 and the photosensor package 152. It has been found, however, that when installing a lens retention clip member (such as that described above), applying torque to the clip member hold down screws can sometimes impart a torque or moment to the lens retention clip member. This torque or moment can result in a slight rotation of the lens retention clip member. This, in turn, can sometimes cause the lens assembly 210 to rotate slightly (such that the optical axis of the lens assembly is no longer perpendicular to the photosensor) and/or cause the lens assembly to linearly move either toward or away from the photosensor (detrimentally affecting the focus of the system).

The imaging device 60 described herein includes provisions that resist such rotation or linear movement of the lens assembly and, thus, enhance the image quality produceable by the imaging device 60, as will now be explained in detail. Referring, for example, to FIG. 5, it can be appreciated that, when a clockwise tightening torque 226 is applied to the screws 260, 280, a component of this torque tends to be transmitted to the lens retention clip member 240 (via frictional contact between the heads of the screws 260, 280 and the upper surfaces 252, 272, respectively). This transmitted torque urges the lens retention clip member 240 to rotate in a clockwise direction 226. The lens retention clip member anti-rotation tabs 256, 276, however, cooperate with the housing anti-rotation ribs 346, 316, respectively, to resist the transmitted torque and prevent the lens retention clip member 240 from rotating. Specifically, as can be seen from FIG. 5, the lens retention clip member anti-rotation tab 256 abuts the housing anti-rotation rib 346 in a manner so as to resist clockwise rotation of the lens retention clip member 240 relative to the housing 200. In a similar manner, the lens retention clip member anti-rotation tab 276 abuts the housing anti-rotation rib 316 in a manner so as to also resist clockwise rotation of the lens retention clip member 240 relative to the housing 200.

As can be appreciated from the above, the lens retention clip member anti-rotation tabs 256, 276 cooperate with the housing anti-rotation ribs 316, 346 to prevent rotation of the lens retention clip member 240 during tightening of the screws 260, 280 and, thus, enhance the final alignment of the lens assembly 210 relative to the photosensor package 152.

Referring, for example, to FIG. 7, it can be seen that the lens retention clip member anti-rotation tabs 256, 276 (only 256 is illustrated in FIG. 7) angle downwardly (as viewed in FIG. 7) relative to the reminder of the lens retention clip member wing portions (250, 270). This downward angling ensures that the anti-rotation tabs 256, 276 will still contact the housing anti-rotation ribs 316, 346 (in a manner as described above) even when the screws 260, 280, e.g., FIG. 5, have been tightened, causing deformation of the lens retention clip member wings 250, 270.

Referring, for example, to FIGS. 10 and 11, it can be seen that the downward deflection of the wing portion 250 between the support members 340, 342 causes the front and rear portions (as viewed in FIGS. 10 and 11) of the wing portion 250 to deflect upwardly. As can be appreciated, however, the downward angle of the anti-rotation tab 256, relative to the remainder of the wing portion 250, ensures that the anti-rotation tab will still contact the housing anti-rotation rib 346, e.g., FIG. 5, even when the wing portion 250 is deflected, as shown in FIGS. 10 and 11. Accordingly, the downward angling of the anti-rotation tabs 256, 276 ensures that the anti-rotation feature described above will function during all conditions.

As an alternative to the installation procedure described above, the intermediate tightening step (as illustrated in FIG. 10) may be omitted. In this case, the focus of the lens assembly 210 may be set before the screws 260, 280 are inserted. Then, when the desired focus is achieved, the screws may be inserted and fully tightened, as shown in FIG. 11. This alternative may be advantageous in some situations because it eliminates a step from the focus setting procedure. Specifically, the intermediate step illustrated in FIG. 10 may be eliminated. If this alternative procedure is used, the support members 310, 312, 340, 342, e.g., FIG. 3, may also be omitted since, as described above, the purpose of these support members is to allow the lens retention clip member wing portions 250, 270 to deflect slightly during the intermediate step illustrated in FIG. 10. If the support members 310, 312, 340, 342 are omitted, then there will also be no need to angle the lens retention clip member anti-rotation tabs 256, 276 downwardly in a manner as described above and as illustrated in FIG. 7, with respect to the anti-rotation tab 256.

Although the alternative described above may be advantageous in some situations, in some cases it may be more desirable to retain the intermediate tightening step in order to ensure that the lens retention clip member remains stable and in the desired location while focus is being set.

As illustrated in FIG. 12, a shroud member 70 may be attached to the inner surface 80 of the sidewall 46. Shroud member 70 may be provided in order to prevent stray light from reaching the photosensor package 152. Shroud member 70 may also provide a downward force on the photosensor package 152 to ensure that the photosensor package remains in tight contact with the references surfaces in the photosensor mounting area 150. The shroud member 70 may, for example, be manufactured from a plastic material such as Nylon 610. The sidewall 46 may, for example, be formed of a plastic material such as polycarbonate. Both the sidewall 46 and the shroud member 70 may, for example, be formed in conventional injection molding processes.

As can be appreciated, integrally forming both the photosensor mounting area 150 and the lens mounting area 200 into the sidewall 46 allows the photosensor mounting area 150 to be accurately referenced to the lens mounting area 200 and also allows both the photosensor mounting area 150 and the lens mounting area to be accurately referenced to the sidewall 46. Accordingly, the photosensor package 152, mounted as described above, will be accurately referenced with respect to the lens assembly 210. Further, both the photosensor package 152 and the lens assembly 210 will also be accurately referenced with respect to the sidewall 46.

It is noted that the foregoing has been described in conjunction with a barcode reader in a media handling device for purposes of illustration only. The apparatus and methods described herein could alternatively be used in a barcode reader in any application, such as a fixed barcode reader on an assembly line or a hand-held barcode scanner. They could also be used in imaging systems other than barcode readers. Examples include optical scanning devices, photocopiers and telefax machines.

It is noted that the various numeric dimensions and specifications used throughout this description are provided for exemplary purposes only and are not to be construed as limiting, in any way, the invention recited in the appended claims.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. An imaging apparatus comprising:
    an imaging apparatus housing, said imaging apparatus housing comprising at least one first reference surface and at least one second reference surface, said first and second reference surfaces being rigidly affixed to said housing;
    wherein, said at least one first reference surf ace is coplanar with said at least one second reference surface;
    wherein, said at least one first reference surface is discontinuous with said at least one second reference surface;
    at least one lens assembly in contact with both said at least one first and at least one second reference surfaces;
    a photosensor assembly;
    wherein, said housing further includes at least one photosensor assembly reference surface; and
    wherein, at least a portion of said photosensor assembly is in contact with said at least one photosensor assembly reference surface.

2. The imaging apparatus of claim 1 and further comprising:
    a recess formed between said at least one first reference surface and said at least one second reference surface.

3. The imaging apparatus of claim 1 wherein:
    said lens assembly has a generally cylindrical outer profile; and
    said generally cylindrical outer profile is in contact with both said at least one first and at least one second reference surfaces.

4. The imaging apparatus of claim 1 wherein:
    said imaging apparatus housing further comprises at least one third reference surface and at least one fourth reference surface;
    wherein, said at least one third reference surface is coplanar with said at least one fourth reference surface;
    wherein, said at least one third reference surface is discontinuous with said at least one fourth reference surface;
    said at least one lens assembly is in contact with both said at least one third and said at least one fourth reference surfaces.

5. The imaging apparatus of claim 4 and further comprising:
    a recess formed between said at least one third reference surface and said at least one fourth reference surface.

6. The imaging apparatus of claim 4 wherein said at least one first reference surface is not coplanar with said at least one third reference surface.

7. The imaging apparatus of claim 4 wherein said at least one first reference surface and said at least one third reference surface together form a v-shaped configuration.

8. The imaging apparatus of claim 1 wherein:
    said housing further comprises at least one wall member;
    said at least one first reference surface and said at least one second reference surface are integrally formed in said wall member;
    said wall, member includes a mounting mechanism integrally formed therein; and
    a light source mounted on said mounting mechanism.

9. A method of assembling all imaging apparatus, said method comprising:
    providing an imaging apparatus housing comprising at least one first reference surface and at least one second reference surface, said first and second reference surfaces being rigidly affixed to said housing;
    providing at least one lens;
    wherein, said at least one first reference surface is coplanar with said at least one second reference surface;
    wherein, said at least one first reference surface is discontinuous with said at least one second reference surface;
    using said at least one first reference surface and said at least one second reference surface to align said lens with said imaging apparatus housing by contacting said lens with said at least one first reference surface and said at least one second reference surface;
    providing at least one photosensor assembly;
    providing said housing with at least one photosensor assembly reference surface; and
    aligning said at least one photosensor assembly with said housing by contacting at least a portion of said photosensor assembly with said photosensor assembly reference surface.

10. The method of claim 9 and further comprising:

providing said lens housed within a lens assembly; and wherein said using said at least one first reference surface and said at least one second reference surface to align said lens comprises contacting said lens assembly with said at least one first reference surface and said at least one second reference surface.

11. The method of claim 10 and further comprising:

adjusting the focus of said at least one lens assembly by sliding said lens assembly along said at least one first reference surface and said at least one second reference surface.

12. The method of claim 9 wherein:

said lens assembly has a generally cylindrical outer profile; and said contacting said lens assembly with said at least one first reference surface and said at least one second reference surface comprises contacting said generally cylindrical outer profile with said at least one first reference surface and at least one second reference surface.

13. The method of claim 9 further comprising;

providing a recess formed between said at least one first reference surface and said at least one second reference surface.

14. The method of claim 9, and further comprising:

providing said imaging apparatus housing with at least one third reference surface and at least one fourth reference surface;

wherein, said at least one third reference surface is coplanar with said at least one fourth reference surface;

wherein, said at least one third reference surface is discontinuous with said at least one fourth reference surface; and using said at least one third reference surface and said at least one fourth reference surface to align said lens with said imaging apparatus housing.

15. The method of claim 14 and further comprising:

providing a recess between said at least one third reference surface and said at least one fourth reference surface.

16. The method of claim 14 wherein said at least one first reference surface is not coplanar with said at least one third reference surface.

17. The method of claim 14 wherein said at least one first reference surface and said at least one third reference surface together form a v-shaped configuration.

* * * * *

UNITED STATES PATENT AND TRADEMARK OFFICE
CERTIFICATE OF CORRECTION

PATENT NO. : 6,897,432 B2  Page 1 of 1
APPLICATION NO. : 09/813205
DATED : May 24, 2005
INVENTOR(S) : Gregg S. Schmidtke et al.

It is certified that error appears in the above-identified patent and that said Letters Patent is hereby corrected as shown below:

In column 12, line 23, delete "reminder" and insert -- remainder --, therefor.

In column 13, line 52, in Claim 1, delete "housing:" and insert -- housing; --, therefor.

In column 13, line 53, in Claim 1, delete "surf ace" and insert -- surface --, therefor.

In column 14, line 40, in Claim 8, after "wall" delete ",".

In column 14, line 43, in Claim 9, delete "all" and insert -- an --, therefor.

In column 15, line 14, in Claim 12, delete "claim 9" and insert -- claim 10 --, therefor.

In column 15, line 23, in Claim 13, delete "comprising;" and insert -- comprising: --, therefor.

Signed and Sealed this

Eleventh Day of August, 2009

David J. Kappos
*Director of the United States Patent and Trademark Office*